United States Patent [19]

Slosiarek et al.

[11] 4,274,671
[45] Jun. 23, 1981

[54] DEVICE FOR REPLACING RESILIENT ISOLATORS

[75] Inventors: Michael L. Slosiarek, Greenfield; William J. Zajichek, New Berlin, both of Wis.

[73] Assignee: Allis-Chalmers Corporation, Milwaukee, Wis.

[21] Appl. No.: 102,653

[22] Filed: Dec. 12, 1979

[51] Int. Cl.³ .............................................. B62D 23/00
[52] U.S. Cl. ................................ 296/190; 180/89.12; 248/544; 296/35.1
[58] Field of Search ............................ 296/190, 35.1; 180/89.12, 89.13, 89.14; 248/544; 105/456, 197 A, 1 B

[56] References Cited

U.S. PATENT DOCUMENTS 3,834,754  9/1974  Zajichek ............................ 296/35.1

Primary Examiner—John J. Love
Assistant Examiner—John A. Carroll
Attorney, Agent, or Firm—Arthur L. Nelson

[57] ABSTRACT

A device for replacing resilient isolators on the vehicle. The resilient isolators isolate the platform from the vehicle chassis and the device permits the operator to replace the isolators individually without assistance from another as a maintenance feature of the vehicle.

10 Claims, 4 Drawing Figures

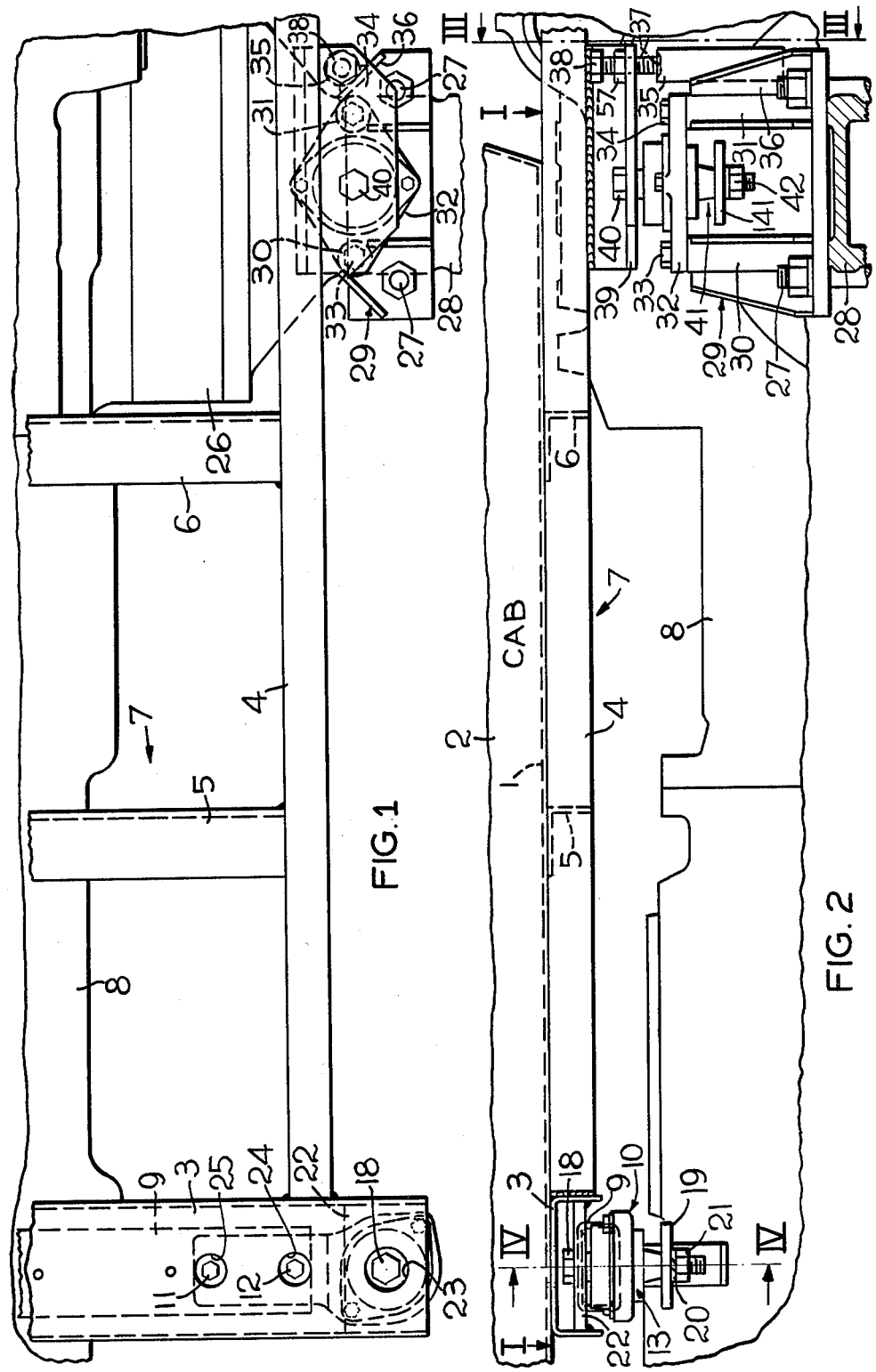

DEVICE FOR REPLACING RESILIENT ISOLATORS

This invention relates to the resilient suspension of the platform or vehicle cab on the vehicle chassis and more particularly to a device for replacing the resilient isolators which resiliently support the platform on the vehicle. The device includes a means for carrying the weight of the platform while the isolators can be removed and replaced by the operator.

Wherever isolators are used conventionally to support the platform or a cab on a vehicle, the normal wear and tear of the isolators may require replacement from time to time. Normally the cab or platform are lifted from the vehicle with a hoist or some means of carrying the weight of the cab or platform while the resilient isolators are removed from the cab or the platform and replaced when the platform or cab again is repositioned on the new isolators. Since this requires considerable equipment it may require leaving of the tractor at a dealer for servicing or replacement of the isolators. Accordingly, this device provides for a means of replacing the resilient isolators, which can be done in the field and conveniently by the operator without any assistance from any other person.

Accordingly, it is an object of this invention to provide a device for replacing isolators on a vehicle.

It is another object of this invention to provide a device to replace the isolators which resiliently support the platform or cab on the vehicle chassis.

It is another object of this invention to provide a device for replacing resilient isolators by using bolts as a jackscrew to raise the platform from the chassis to allow replacement of the resilient isolators. The bolts may be used specifically for this purpose or may be a part of the original assembly which supports a bracket carrying the resilient isolator on the vehicle.

The objects of this invention are accomplished on a vehicle having resiliently mounted isolators mounted on the vehicle chassis and resiliently supporting the platform at the operator station or the vehicle cab. The isolators may be supported on a bracket or mounted directly on the vehicle chassis. The isolators carry the weight of the platform or the cab. For replacement of one or more isolators, one or more bolts are screwed through a threaded opening in the platform and pressed against the vehicle chassis to raise the platform and allow replacement of the isolators. When the isolator is replaced, the platform is allowed to return to its normal operating position. The bolt used as a jackscrew may be carried on the vehicle for this specific purpose or may be a part of the assembly mounting of the resilient isolator on the vehicle chassis; and, accordingly, when the isolator is replaced, the bolt would again be returned to the assembly which supports the resilient isolator on the vehicle chassis.

Referring to the drawings, the preferred embodiment of this invention is illustrated.

FIG. 1 is a section view taken along line I—I of FIG. 2 and showing the plan view of the resilient isolators.

FIG. 2 is a side elevation view of the resilient isolators mounted on the vehicle chassis carrying the platform.

Figure 3:
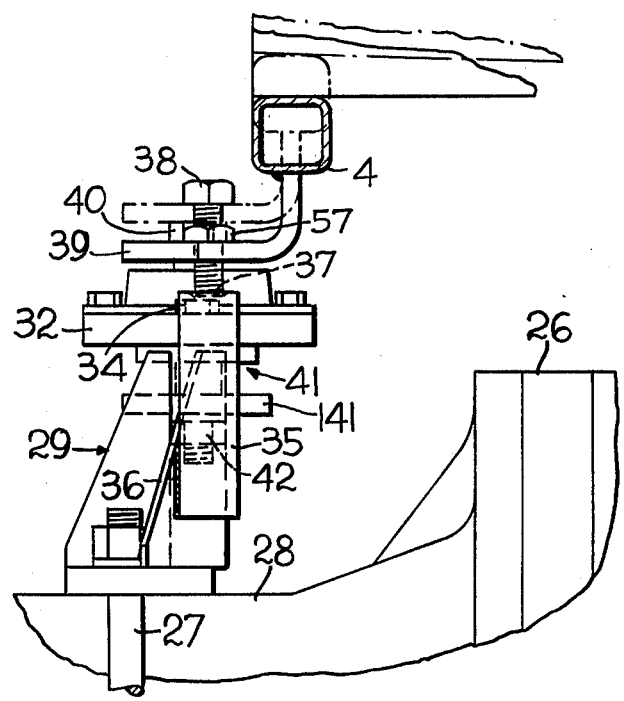
FIG. 3 is a cross-section view taken on line III—III of FIG. 2 showing the mounting of the rear resilient isolator supported on the vehicle chassis carrying the platform.

Referring to the drawings, the platform 1 and cab 2 are shown mounted on the platform supporting structure. Essentially the platform supporting structure includes a cross-member 3 formed by a channel underlying the platform. A square tubular member 4 extends longitudinally from a welding on the chanel 3 and rearwardly where it is fabricated to angle irons 5 and 6 which form cross-members parallel with the channel 3. This underlying structure carries the platform. This underlying structure is fastened to the platform and is resiliently isolated from the vehicle chassis.

Figure 4:
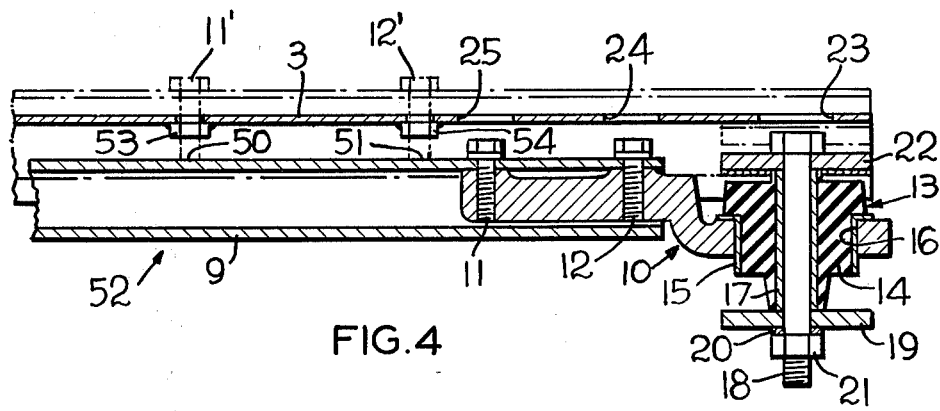
FIG. 4 is a cross-section view taken on line IV—IV of FIG. 2 showing a bracket and resilient isolator supporting the front of the platform on the vehicle chassis.

The platform supporting structure 7 is mounted on the resilient isolators. The vehicle chassis includes a transmission housing 8 which supports the tubular cross-member 9. The tubular cross-member 9 is fastened to the transmission housing and extends transversely to support the bracket 10. The bracket 10 is fastened with the bolts 11 and 12. The bracket 10 extends transversely from the tubular member 9 to support the resilient isolator 13. The resilient isolator 13, as shown in FIG. 4, includes the isomer 14, sleeve 15 which is supported in an opening 16 in the bracket 10. The isolator also includes the sleeve 17 encircling the bolt 18 which extends through the isolator. The base of the isolator is mounted on a plate 19 and the washer 20 and nut 21 fastens the bolt assembly to the isolator assembly.

The plate 22 is welded on the inside of the channel 3 which forms part of the platform support assembly 7. The channel 3 is formed with an opening 23 to permit access to the head of the bolt 18 for disassembling the isolator. Similarly, openings 24 and 25 are provided for access for removing the bolts 12 and 11 from the bracket 10 and disassembly of the bracket and removing of the isolator. The front bracket assembly is shown in FIG. 4 and on the left-hand side of FIGS. 1 and 2.

The right-hand portions of FIG. 1 and 2 and FIG. 3 show the rear isolator and mounting assembly.

The final drive housing 26 provides the support for the rear portion of the cab and the platform. A U-bolt 27 fastens around the drive axle housing 28 and fastens the support bracket 29. The support bracket 29 includes two spacers 30 and 31 which support the plate 32. The U-bolt 27 holds the bracket 29 firmly on the drive axle housing 28 while the bolts 33 and 34 fasten the isolator to the chassis. The pressure block 35 is welded to the gussett 36 and provides a pressure surface 37 for the screw 38 which operates as a jackscrew to lift the bracket 39 which supports the platform supporting structure 7.

The bolt 40 extends through the rear isolator 41 and clamps against a central sleeve as shown in the isolator of FIG. 4. The isolator used to resiliently support the rear portion of the bracket is the same as that shown in FIG. 4. The bolt 40 extends through and clamps the plate 141 tightly against the inner sleeve of the isolator when the nut 42 is tightened. Accordingly, the external side of the bracket is mounted on the plate 32 while the internal portion of the isolator is connected to the bracket 39. The bracket 39 is welded under the square tubular member 4. The bracket 39 and tubular member are resiliently supported through the isolator. Accordingly, the platform and cab are resiliently mounted on these four isolators which are in turn supported on the vehicle chassis.

The operation of the device will be described in the following paragraph.

Referring to the front isolator 13, as shown in FIG. 4, when it is desired to replace the isolator, one of the bolts, for the purpose of illustration bolt 11, is removed and is positioned as shown by the bolt 11'. Bolt 12 then is removed and positioned in the position of bolt 12'. The bolts 11' and 12' are then screwed downwardly and forced against the pressure surfaces 50 and 51. This in turn raises the platform supporting structure and the platform from the chassis 52. Threaded openings are formed in the nuts 53 and 54, thereby raising the channel 3 upwardly increasing the space between the channel and the rectangular, tubular cross-member 9. When the space between the channel and the rectangular, tubular cross-member 9 is sufficient, the isolator bolt 18 can be removed and the bracket 10 and isolator 13 can be slid outwardly from the rectangular, tubular cross-member 9 and a new isolator 13 is repositioned in the bracket. If desired, the channel 3 could be raised sufficiently and when the bolt 18 is removed from the isolator. The adequate clearance would permit removal of the isolator directly from the bracket and then replace the isolator with a new isolator and reinstall the isolator in the position of the original isolator. When the new isolators is in position, the bolts 11' and 12' are removed from their position as shown. They are then reinserted in a position shown by the bolts 11 and 12 and the bracket assembly is then complete.

When it is desired to replace the rear isolator, the capscrew 38 is screwed downwardly and it presses against the pressure surface 37 raising the corner of the platform and cab relative to the vehicle chassis. The bolt is screwed down sufficiently so that the isolator can be removed by removing the bolt 40 from the isolator. When this is complete, the bolts 33 and 34 can be removed and the isolator is removed from the assembly. A new isolator is then positioned in the plate 32 and installed as shown in the right-hand portions of FIGS. 1 and 2 and FIG. 3. Repositioning of bolt 40 in the assembly completes the replacement of the isolator and the bolt 38 is then withdrawn from the lifting position shown. The bolt 38 can be stored in the position shown by positioning the lock nut 57 on the bolt and tightening the lock nut to maintain the bolt in the position for storage. The bolt should be withdrawn adequately so that it does not interfere with the normal action of the isolator when the vehicle is in operation.

The embodiments of the invention in which an exclusive property or privilege is claimed are defined as follows.

1. A device for replacing an isolator on the vehicle comprising, a vehicle chassis, a resiliently supported member, at least one resilient isolator mounted on said vehicle chassis resiliently supporting said resiliently supported member, means defining a threaded opening in said resiliently supported member axially aligned with a pressure surface on said vehicle chassis, a bolt for reception in said threaded opening to press against said pressure surface for raising said resiliently supported member from said vehicle chassis and thereby allow removing of said resilient isolator from said chassis and supported member and replacing said isolator with another.

2. A device for replacing an isolator on a vehicle as set forth in claim 1 including a bracket on said vehicle chassis supporting said isolator.

3. A device for replacing an isolator on a vehicle as set forth in claim 2 wherein said bolt for lifting said resiliently supported member from said vehicle chassis includes a bolt for connection of said bracket to said vehicle chassis.

4. A device for replacing of an isolator on a vehicle chassis set forth in claim 1 wherein said resiliently supported member includes a platform.

5. A device for replacing an isolator on a vehicle as set forth in claim 1 wherein said resiliently supported member includes a cab.

6. A device for replacing an isolator on a vehicle as set forth in claim 1 including a plate defining a rigid surface defining said pressure surface.

7. A device for replacing an isolator on a vehicle as set forth in claim 1 wherein said resiliently supported member includes a platform supporting structure, a platform on said platform supporting structure.

8. A device for replacing an isolator on a vehicle as set forth in claim 1 wherein said resiliently supported member includes a cross-member extending across the vehicle chassis, said means defining said threaded opening includes said cross-member for reception of said bolt.

9. A device for replacing an isolator on a vehicle as set forth in claim 1 including a bracket mounted on said vehicle chassis supporting said isolator, a bracket supporting said resiliently supported member, a means connecting said resilient isolator between said brackets for resiliently supporting said resiliently supported member.

10. A device for replacing an isolator on a vehicle as set forth in claim 1 including a bracket supporting said resiliently supported member, a bolt threadedly mounted in said bracket, means for retaining said bolt in the normal storage position on said bracket when not used for supporting said bracket.

* * * * *